US012697714B2

(12) United States Patent
    Zhong

(10) Patent No.:   US 12,697,714 B2
(45) Date of Patent:         Aug. 4, 2026

(54) ACTUATOR WITH PLANETARY REDUCER, AND ROBOT JOINT

(71) Applicant: Fourier Intelligence Inc., Shanghai (CN)

(72) Inventor: Xuegang Zhong, Shanghai (CN)

(73) Assignee: Fourier Intelligence Inc., Shanghai (CN)

( * ) Notice:     Subject to any disclaimer, the term of this patent is extended or adjusted under 35 U.S.C. 154(b) by 0 days.

(21) Appl. No.: 19/362,512

(22) Filed:     Oct. 20, 2025

(65)               Prior Publication Data

US 2026/0158643 A1      Jun. 11, 2026

Related U.S. Application Data

(63) Continuation      of      application      No. PCT/CN2025/113979, filed on Aug. 12, 2025.

(30)         Foreign Application Priority Data

Dec. 10, 2024    (CN) .......................... 202411805235.8

(51) Int. Cl.
    *F16H 1/28*          (2006.01)
    *B25J 9/10*          (2006.01)
    *F16H 57/02*         (2012.01)

(52) U.S. Cl.
    CPC ............... *B25J 9/102* (2013.01); *F16H 1/28* (2013.01); *F16H 57/02* (2013.01); *F16H 2057/02034* (2013.01); *F16H 2057/02073* (2013.01)

(58) Field of Classification Search
    CPC .................................... F16H 1/28; B25J 17/00
    See application file for complete search history.

(56)               References Cited

FOREIGN PATENT DOCUMENTS

| | | | |
|---|---|---|---|
| CN | 111516002 A | | 8/2020 |
| CN | 112109113 A | | 12/2020 |
| CN | 117006204 A | | 11/2023 |
| CN | 118769231 A | | 10/2024 |
| CN | 221936798 U | * | 11/2024 |
| CN | 119260707 A | | 1/2025 |
| JP | H09303494 A | | 11/1997 |
| KR | 20110034494 A | | 4/2011 |
| WO | 2016011921 A1 | | 1/2016 |

* cited by examiner

*Primary Examiner* — Gregory Robert Weber
(74) *Attorney, Agent, or Firm* — Bayramoglu Law Offices LLC

(57)               ABSTRACT

An actuator includes a housing, a motor, and a planetary reducer. The planetary reducer includes an inner ring gear, a sun gear, a planetary carrier, and a planetary gear; the inner ring gear is provided with a projecting support rib; an inner side surface of the projecting support rib is provided with a detachably fixed pressing member; the motor includes a stator and a rotor; the rotor is synchronously connected to the sun gear through a connection carrier; the connection carrier includes an outer carrier and an inner carrier; an outer periphery of the inner carrier is fixedly connected to an inner periphery of the outer carrier; and a bearing is disposed between the projecting support rib and the inner carrier; the bearing includes an outer ring clamped between a pressing member and the projecting support rib and an inner ring clamped between the outer carrier and inner carriers.

18 Claims, 4 Drawing Sheets

ACTUATOR WITH PLANETARY REDUCER, AND ROBOT JOINT

CROSS REFERENCE TO THE RELATED APPLICATIONS

This application is a Continuation Application of International Application No. PCT/CN2025/113979, filed on Aug. 12, 2025, which is based upon and claims priority to Chinese Patent Application No. 202411805235.8, filed on Dec. 10, 2024, the entire contents of which are incorporated herein by reference.

TECHNICAL FIELD

The present disclosure relates to the technical field of robot drive, and in particular to an actuator with a planetary reducer, and a robot joint.

BACKGROUND

An actuator serves as a core component of a robot joint to provide power for the relative motion between two moving parts of the robot joint and to precisely control the motion angles of the two moving parts in the robot joint.

The actuator generally includes a housing, a motor, and a reducer. The reducer of the existing actuator is generally a planetary reducer, but the existing planetary reducer occupies much of the radial space of the actuator. As a result, a motor chamber is formed between the interior of the housing of the actuator and the inner ring gear of the planetary reducer to accommodate a frameless torque motor. The power output by the frameless torque motor is transmitted to the sun gear of the planetary reducer. To this end, a connection carrier spanning the inner ring gear of the planetary reducer is disposed to synchronously connect the rotor of the frameless torque motor to the sun gear of the planetary reducer.

In order to enable the stable rotation of the connection carrier, the stator, and the sun gear, a bearing is disposed between the housing and the connection carrier (or the stator), thereby providing radial support for the connection carrier or the stator through the bearing. However, in the existing actuator, the bearing is disposed between the outer periphery of the connection carrier and the housing. Since the bearing occupies a certain radial space, the radial dimension of the actuator becomes relatively large, which cannot meet the demand for a compact overall structure of the actuator.

To prevent the bearing from occupying the radial space of the actuator, in some actuators, the bearing is disposed between the inner side of the inner ring gear fixed in a matched manner to the housing and the connection carrier to provide radial support for the connection carrier. To assemble the bearing with the connection carrier and the inner ring gear, the inner ring and the outer ring of the bearing are respectively snapped onto the connection carrier and the inner ring gear by press-fitting. Thus, the inner ring of the bearing is in an interference fit with the connection carrier, and the outer ring of the bearing is in an interference fit with the inner ring gear. However, the press-fitting method increases the difficulty in assembling the actuator, and requires a specialized tool to assemble and disassemble the bearing, which is likely to damage the bearing during the assembling and disassembling processes. Therefore, the assembly and maintenance of an existing actuator with the above structure is inconvenient.

SUMMARY

The present disclosure aims to solve at least one of the technical problems existing in the prior art. For this purpose, an objective of the present disclosure is to provide an actuator with a planetary reducer, and a robot joint. The present disclosure solves the problem in the prior art that the bearing located between the connection carrier and the inner ring gear of the actuator is difficult to assemble and inconvenient to maintain.

The objective of the present disclosure is achieved through the following technical solutions:

An actuator with a planetary reducer includes a housing, a motor, and a planetary reducer, where the planetary reducer includes an inner ring gear fixed in a matched manner to the housing, and further includes a sun gear, a planetary carrier, and a planetary gear; the sun gear, the planetary carrier, and the planetary gear are all located at an inner side of the inner ring gear; the planetary gear is pivotally connected to the planetary carrier and is meshed between the sun gear and the inner ring gear; a mounting chamber is formed between the inner ring gear and the housing; the inner ring gear is provided with an annular projecting support rib; and an inner side surface of the projecting support rib is provided with a pressing member detachably fixed to the projecting support rib;

the motor is disposed inside the mounting chamber, and includes a stator fixed in a matched manner to the housing and a rotor matched with the stator; and the rotor is synchronously connected to the sun gear through a connection carrier; and the connection carrier includes an outer carrier and an inner carrier; the outer carrier includes an outer periphery fixedly connected to the rotor and an inner periphery spanning above an end portion of the projecting support rib and extending to an inner side of the projecting support rib; an outer periphery of the inner carrier is fixedly connected to the inner periphery of the outer carrier through a bolt; the inner carrier is configured to be embedded into the projecting support rib through an opening at the end portion of the projecting support rib; a bearing is provided between the projecting support rib and the inner carrier to pivotally connect the connection carrier to the projecting support rib; and the bearing includes an outer ring clamped between the pressing member and the projecting support rib and an inner ring clamped between the outer carrier and the inner carrier.

In the embodiment of the present disclosure, the pressing member and the projecting support rib abut against two end portions of the outer ring of the bearing to fix the outer ring of the bearing to the projecting support rib. The outer carrier and the inner carrier abut against two ends of the inner ring of the bearing to fix the inner ring of the bearing to the connection carrier. The inner ring and the outer ring of the bearing do not require an interference fit with the connection carrier and the projecting support rib, thereby eliminating the need for a special press-fitting tool to assemble and disassemble the bearing. Therefore, the bearing is easy to assemble and disassemble, and the process will not cause damage to the bearing. The inner carrier and the outer carrier of the connection carrier have a split structure, so the mounting process does not interfere with the bearing. Therefore, the connection carrier and the bearing can be rapidly assembled into the housing from one end portion of the housing of the actuator without interfering with other components inside the housing of the actuator. This design facilitates the overall assembly of the actuator.

In a preferred embodiment, the housing includes a side wall and a support wall extending inward from an inner surface of the side wall along a radial direction of the actuator; a lower end portion of the inner ring gear is connected to the support wall; and the mounting chamber is enclosed by the inner ring gear, the side wall, and the support wall. The support wall extending radially serves as a fixed base for the inner ring gear, enabling the inner ring gear to be fixed in a matched manner to the housing. Therefore, the mounting chamber for placing the motor is formed with an upper opening, facilitating the placement of the motor into the mounting chamber from top to bottom and further facilitating the assembly of the actuator.

In a preferred embodiment, the outer carrier includes a first fixing ring located at the outer periphery of the outer carrier, a second fixing ring located at the inner periphery of the outer carrier, and a connection rib connected between the first fixing ring and the second fixing ring; the second fixing ring is disposed above an upper surface of the outer periphery of the inner carrier; a bottom of the outer periphery of the inner carrier is provided with a support rib extending outward; and the inner ring of the bearing includes a top end abutting against a lower surface of the second fixing ring and a bottom end abutting against the support rib. In a preferred embodiment, the bolt passes through the second fixing ring from top to bottom and is screwed into the outer periphery of the inner carrier; and the lower surface of the second fixing ring and the upper surface of the outer periphery of the inner carrier form a clearance fit. During the assembly process, the bolt is tightened to press the second fixing ring downward. The lower surface of the second fixing ring contacts a top surface of the inner ring of the bearing and continuously pushes the inner ring of the bearing downward until the bottom end of the inner ring of the bearing is pressed against the support rib. Since the lower surface of the second fixing ring and the upper surface of the outer periphery of the inner carrier are in a clearance fit, the second fixing ring can fully press the inner ring of the bearing downward. This can eliminate the fit clearance between the bottom end of the inner ring of the bearing and the support rib, preventing axial loosening of the inner ring of the bearing relative to the connection carrier.

In a preferred embodiment, the first fixing ring is disposed above the projecting support rib and is provided with a connection arm extending downward and fixedly connected to the rotor; in the radial direction of the actuator, at least one segment of the connection rib is gradually inclined downward from an outer side to an inner side, such that the second fixing ring is disposed between a top end surface of the projecting support rib and the upper surface of the outer periphery of the inner carrier. The second fixing ring is disposed between a top end surface of the projecting support rib and the upper surface of the outer periphery of the inner carrier. Thus, in the height direction, the height of the lower surface of the second fixing ring is reduced. The connection carrier can span the inner ring gear, and the mounting position of the bearing is not too high. The position of the bearing can be as close as possible to the center of gravity of the rotating structure formed by the connection carrier and the rotor, improving the stability of the rotation of the rotor. The connection carrier of the inner carrier is set as a sunken structure to make space for other components inside the actuator. This design makes the internal structure of the actuator more compact, thereby reducing the axial dimension of the actuator.

In a preferred embodiment, the inner side surface of the projecting support rib is provided with a support step and a snap groove located above the support step; the pressing member is a snap ring snapped into the snap groove; and the outer ring of the bearing includes a top end abutting against the snap ring and a bottom end abutting against the support step. The snap groove of the projecting support rib holds the snap ring in place on the projecting support rib, preventing axial movement of the snap ring. Thus, the snap ring cooperates with the support step to fix the outer ring of the bearing to the projecting support rib, preventing axial movement of the outer ring of the bearing relative to the projecting support rib.

In a preferred embodiment, the housing further includes an upper cover; and the upper cover is detachably fixed to an upper end portion of the side wall. Through the detachable upper cover, the motor, the planetary reducer, and the connection carrier can be disposed into the internal space of the housing through an opening at the upper end portion of the side wall. Then the upper cover is fixed to the upper end portion of the side wall, thereby utilizing the upper cover to enclose the internal space of the housing. This further facilitates the overall assembly of the actuator.

In a preferred embodiment, the inner carrier is provided with a shaft sleeve extending downward; a shaft of the sun gear is inserted into the shaft sleeve; an upper end surface of the sun gear abuts against a lower end surface of the shaft sleeve; and the shaft sleeve is connected to the shaft of the sun gear through a key. Through the shaft sleeve, the inner periphery of the inner carrier is connected to the shaft sleeve of the sun gear, increasing the axial dimension for the cooperation between the inner carrier and the sun gear. Thus, the synchronous connection between the connection carrier and the sun gear is more stable, making the power transmission between the connection carrier and the planetary reducer smoother.

In a preferred embodiment, a bottom surface of the inner carrier is offset upward from an upper end surface of an inner tooth of the inner ring gear by a distance of 0-8 mm; the bottom surface of the inner carrier is provided with an avoidance groove recessed upward; and at least a portion of the planetary carrier is embedded in the avoidance groove. By providing the avoidance groove in the inner carrier, the planetary carrier is avoided in the axial direction of the actuator, thereby preventing interference between the planetary carrier and the connection carrier. In addition, this design reduces the space occupied by the planetary reducer and the connection carrier in the axial direction of the actuator, thereby reducing the axial dimension of the actuator.

A robot joint includes the aforementioned actuator with a planetary reducer.

The drawings constituting a part of the present disclosure provide further understanding of the present disclosure. The schematic embodiments of the present disclosure and description thereof are intended to be illustrative of the present disclosure and do not constitute an undue limitation of the present disclosure.

Figure 1:
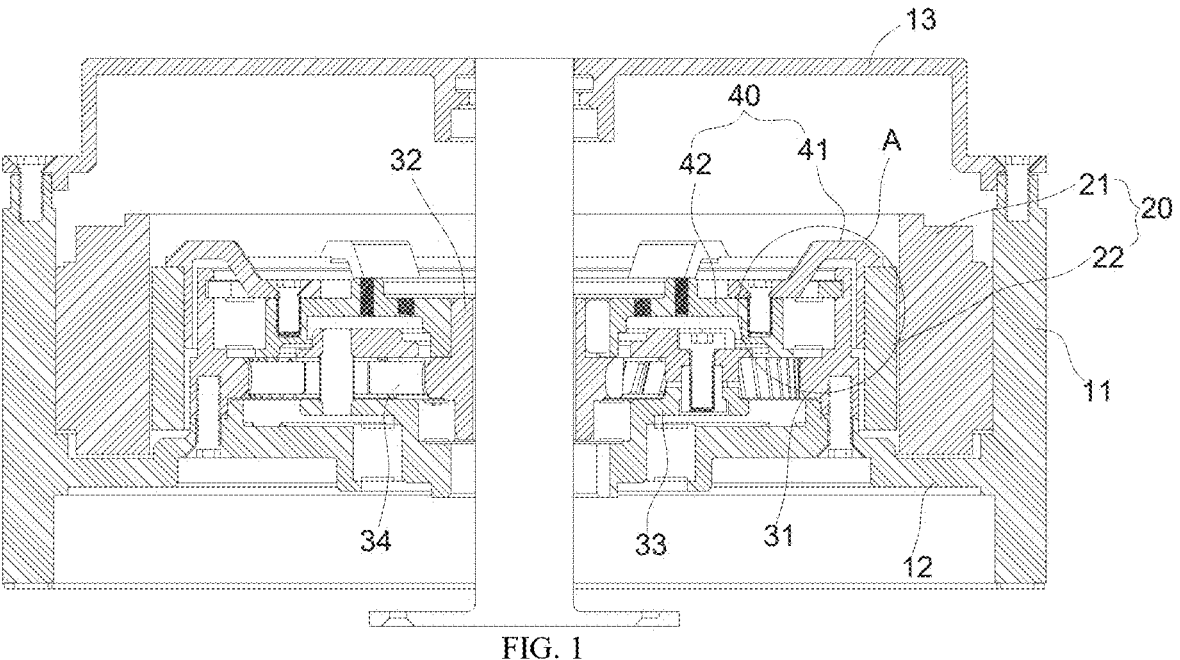
FIG. 1 is a cross-sectional view of an actuator with a planetary reducer according to the present disclosure.

Reference Numerals: 11. side wall; 12. support wall; 13. upper cover; 20. motor; 21. stator; 22. rotor; 31. inner ring gear; 311. projecting support rib; 312. support step; 313. snap ring; 314. snap groove; 315. upper end surface; 32. sun gear; 33. planetary carrier; 34. planetary gear; 35. bearing; 40. connection carrier; 41. outer carrier; 411. first fixing ring; 412. second fixing ring; 4120. lower surface; 413. connection rib; 414. connection arm; 42. inner carrier; 420. upper surface; 4201. gap; 421. support rib; 422. shaft sleeve; 423. bottom surface; 424. avoidance groove; and 43. bolt.

DETAILED DESCRIPTION OF THE EMBODIMENTS

The present disclosure is further described below in combination with the drawings and specific implementations.

Figure 2:
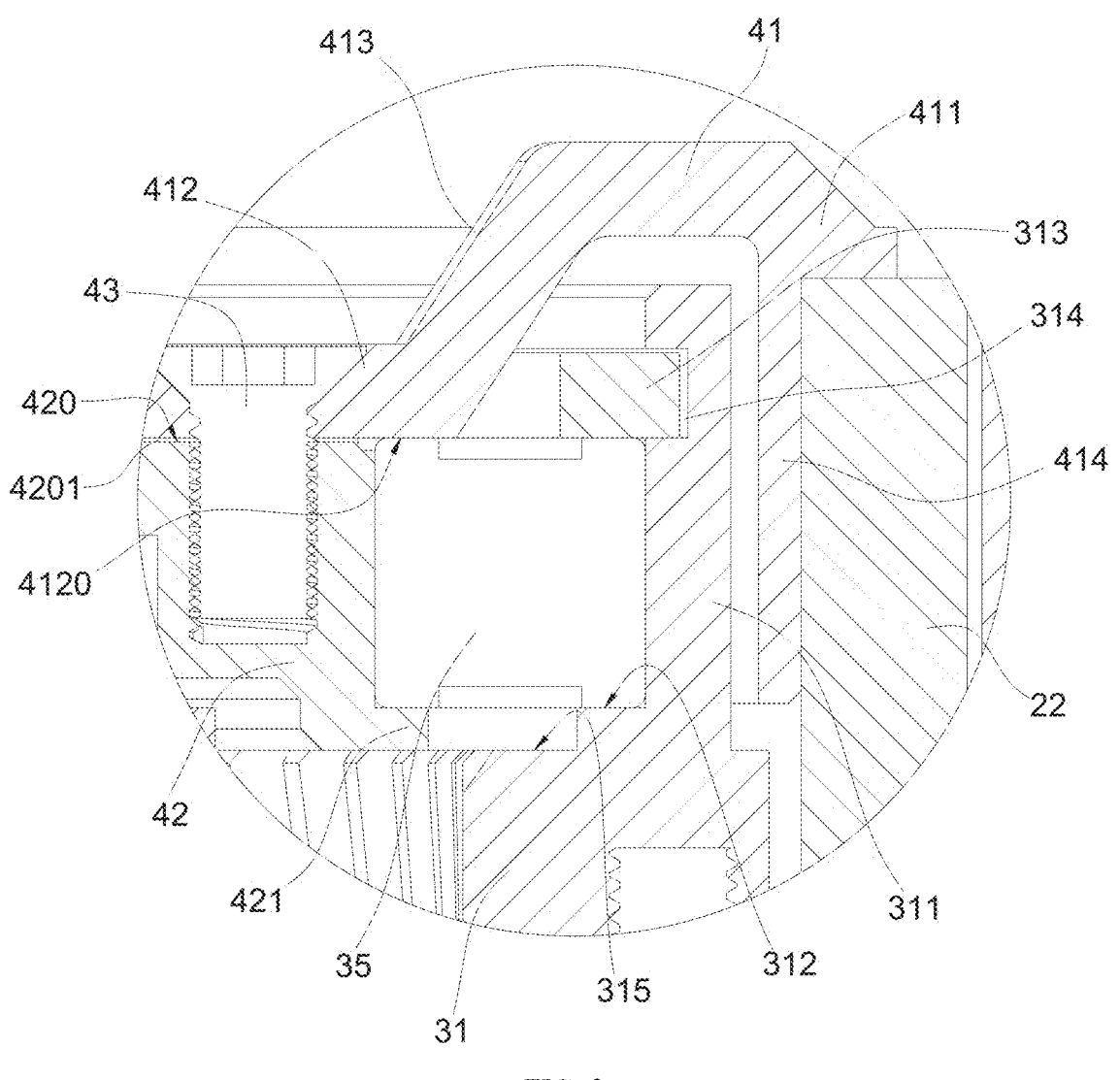
FIG. 2 is a detail of A shown in FIG. 1.
Figure 3:
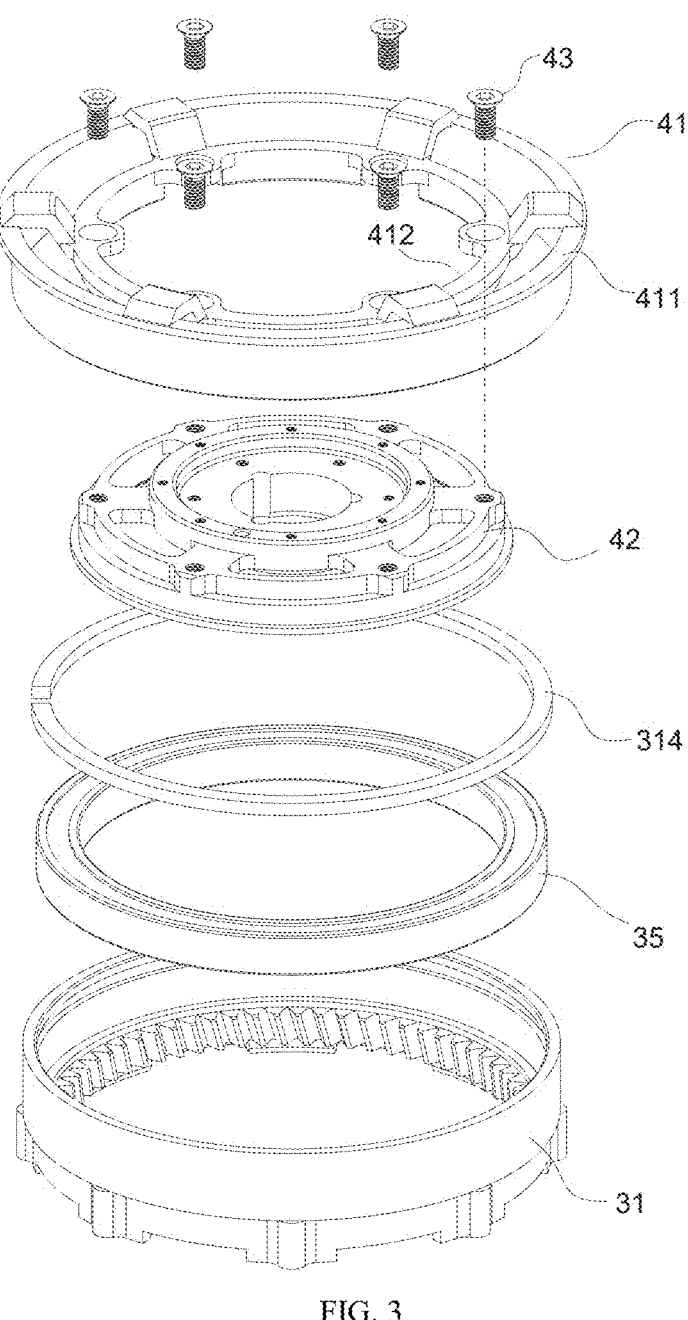
FIG. 3 is an exploded view of a connection carrier and an inner ring gear shown in FIG. 1.
Figure 4:
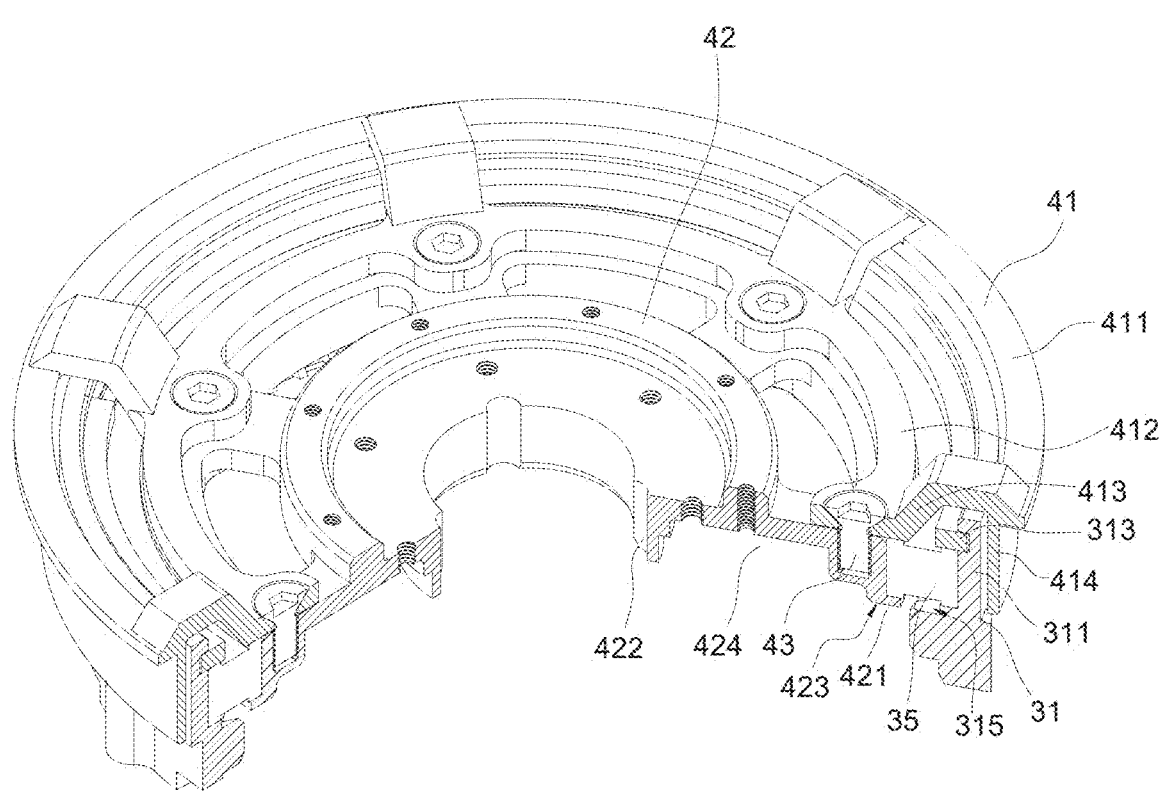
FIG. 4 is a cross-sectional view of the connection carrier and the inner ring gear shown in FIG. 1.
Figure 5:
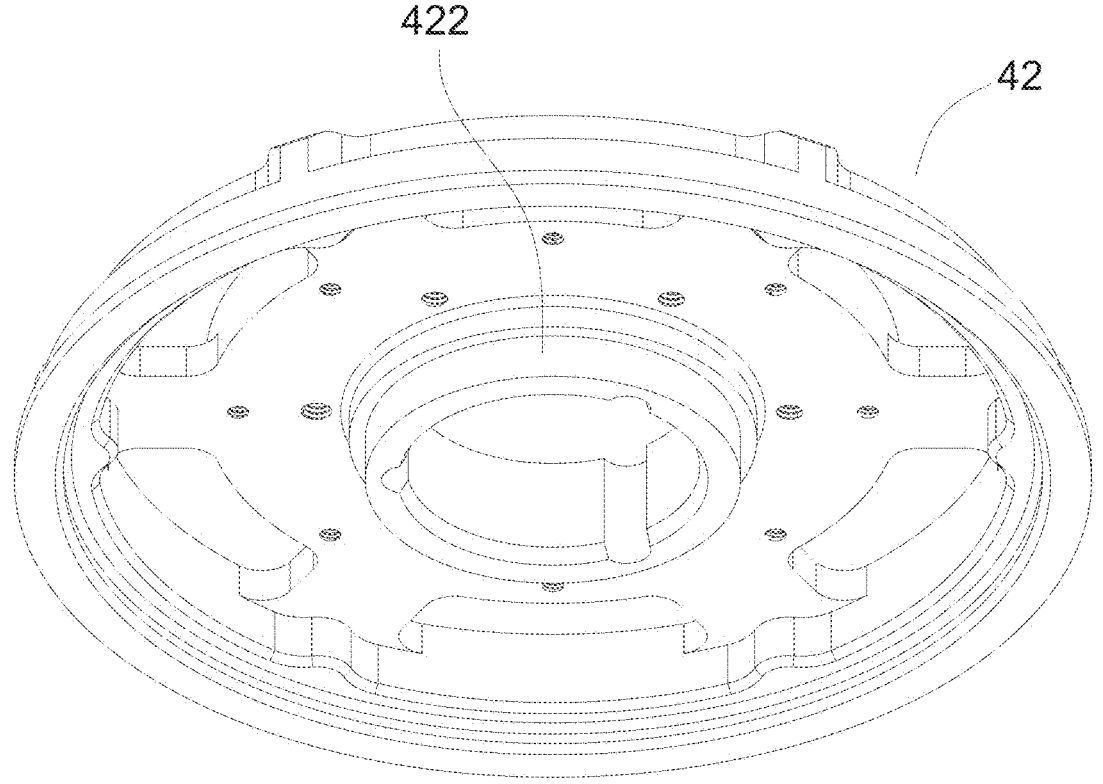
FIG. 5 is a structural view of an outer carrier shown in FIG. 4.

FIGS. 1 to 5 show an actuator with a planetary reducer according to the present disclosure. The actuator includes a housing, motor 20, and a planetary reducer. The planetary reducer includes inner ring gear 31, sun gear 32, planetary carrier 33, and planetary gear 34. The inner ring gear 31 is fixed in a matched manner to the housing and serves as a fixed component of the planetary reducer. The sun gear 32, the planetary carrier 33, and the planetary gear 34 are all located at an inner side of the inner ring gear 31 (i.e., inside a circular space enclosed by the inner ring gear 31). The planetary gear 34 is pivotally connected to the planetary carrier 33, and the planetary gear 34 is meshed between the sun gear 32 and the inner ring gear 31. A mounting chamber is formed between the inner ring gear 31 and the housing. A top of the inner ring gear 31 is provided with projecting support rib 311 that projects upward and is annular. An inner side surface of the projecting support rib 311 is provided with snap ring 313 engaged with the projecting support rib 311. The mounting chamber is annular, surrounding an axis of the actuator. The motor 20 is disposed inside the mounting chamber. The motor is a frameless torque motor, including stator 21 and rotor 22. The stator 21 is fixed in a matched manner to the housing. The stator 21 and the rotor 22 are matched, enabling the rotor 22 to rotate relative to the stator 21. The rotor 22 is synchronously connected to the sun gear 32 through connection carrier 40.

The connection carrier 40 includes outer carrier 41 and inner carrier 42. The outer carrier 41 includes an outer periphery fixedly connected to the rotor 22 and an inner periphery spanning above the projecting support rib 311 and extending to an inner side of the projecting support rib 311. An outer periphery of the inner carrier 42 is fixedly connected to the inner periphery of the outer carrier 41 by bolt 43. That is, the inner carrier 42 and the outer carrier 41 are detachably fixed, such that the connection carrier 40 forms a split structure composed of the inner carrier 42 and the outer carrier 41. The inner carrier 42 can be embedded into a space enclosed by the projecting support rib 311 through an opening enclosed by a top of the projecting support rib 311. In other words, an outer diameter of the inner carrier 42 is smaller than an inner diameter of the projecting support rib 311, enabling the inner carrier 42 to be located at the inner side of the projecting support rib 311.

Bearing 35 is provided between the projecting support rib 311 and the inner carrier 42. The bearing 35 includes an outer ring fixed in a matched manner to the projecting support rib 311 and an inner ring fixed in a matched manner to the connection carrier 40. Specifically, the outer ring of the bearing 35 is clamped between the snap ring 313 and the projecting support rib 311. A downward pressing force applied by the snap ring 313 cooperates with the projecting support rib 311 to fix the outer ring of the bearing 35 to the projecting support rib 311. The inner ring of the bearing 35 is clamped between the outer carrier 41 and the inner carrier 42 of the connection carrier 40. When the bolt 43 tightens the outer carrier 41 and the inner carrier 42, the inner ring of the bearing 35 is clamped and fixed, such that the inner ring of the bearing 35 is fixed in a matched manner to the connection carrier 40.

In the present disclosure, the bearing 35 is disposed between the projecting support rib 311 and the connection carrier 40. The projecting support rib 311 is disposed on the inner ring gear 31 and is fixed in a matched manner to the housing. Thus, the bearing 35 provides radial support for the connection carrier 40, enabling the assembly formed by the rotor 22, the connection carrier 40, and the sun gear 32 to rotate stably and preventing wobbling during rotation.

During assembly, first, the bearing 35 is sleeved around the outer periphery of the inner carrier 42, and the bearing 35 is embedded at the inner side of the projecting support rib 311. Then, the snap ring 313 is disposed at the inner side of the projecting support rib 311. The snap ring 313, as a pressing member, cooperates with the projecting support rib 311 to clamp and fix the outer ring of the bearing 35. Finally, the outer carrier 41 is disposed on an end portion of the projecting support rib 311. The bolt 43 passes through outer carrier 41 and the inner carrier 42. The bolt 43 is tightened, and the outer carrier 41 and the inner carrier 42 clamp and fix the inner ring of the bearing 35. Thus, the assembly of the connection carrier 40, the bearing 35, and the inner ring gear 31 is completed.

The pressing member and the projecting support rib 311 abut against two end portions of the outer ring of the bearing 35 to fix the outer ring of the bearing 35 to the projecting support rib 311. The outer carrier 41 and the inner carrier 42 abut against two ends of the inner ring of the bearing 35 to fix the inner ring of the bearing 35 to the connection carrier 40. The inner ring and the outer ring of the bearing 35 do not require an interference fit with the connection carrier 40 and the projecting support rib 311, thereby eliminating the need for a special press-fitting tool to assemble and disassemble the bearing 35. Therefore, the bearing 35 is easy to assemble and disassemble, and the process will not cause damage to the bearing 35. The inner carrier 42 and the outer carrier 41 of the connection carrier 40 have a split structure, so the mounting process does not interfere with the bearing 35. Therefore, the connection carrier 40 and the bearing 35 can be rapidly assembled into the housing from one end portion of the housing of the actuator without interfering with other components inside the housing of the actuator during mounting. This design facilitates the overall assembly of the actuator.

It should be pointed out that in the present disclosure, the pressing member fixed to the projecting support rib 311 and configured to press down the outer ring of the bearing 35 is not limited to the snap ring 313. The pressing member can also be other components capable of pressing down the outer ring of the bearing 35. For example, it can be a pressure ring threaded to the inner side of the projecting support rib 311, or other components detachably connected to the inner side surface of the projecting support rib 311.

The housing includes side wall 11 and support wall 12. The side wall 11 has a cylindrical structure. The support wall 12 extends inward from an inner surface of the side wall 11 along a radial direction of the actuator. A lower end portion of the inner ring gear 31 is connected to the support wall 12. The mounting chamber is enclosed by the inner ring gear 31, the side wall 11, and the support wall 12. The support wall 12 extending radially serves as a fixed base for the inner ring gear 31, enabling the inner ring gear 31 to be fixed in a matched manner to the housing. Therefore, the mounting chamber for placing the motor 20 is formed with an upper opening, facilitating the placement of the motor 20 into the mounting chamber from top to bottom and further facilitating the assembly of the actuator.

In other embodiments, the support wall 12 can also be located above the side wall 11. A top end of the inner ring gear 31 is fixed to a lower surface of the support wall 12. The projecting support rib 311 is formed by extending downward from the inner ring gear 31, such that the mounting chamber is formed with a lower opening. The motor 20 is disposed into the mounting chamber from a lower portion of the housing. Correspondingly, the inner periphery of the outer carrier 41 of the connection carrier 40 spans below the projecting support rib 311.

The outer carrier 41 includes first fixing ring 411 located at the outer periphery of the outer carrier, second fixing ring 412 located at the inner periphery of the outer carrier, and multiple connection ribs 413. The connection ribs 413 are connected between the first fixing ring 411 and the second fixing ring 412 to connect the first fixing ring 411 and the second fixing ring 412 integrally. The second fixing ring 412 is disposed above the upper surface 420 of the outer periphery of the inner carrier 42. A bottom of the outer periphery of the inner carrier 42 is provided with support rib 421 extending outward. A top end of the inner ring of the bearing 35 abuts against lower surface 4120 of the second fixing ring 412, and a bottom end of the inner ring of the bearing 35 abuts against the support rib 421.

During the assembly process, first, the bearing 35 is sleeved on the inner carrier 42, and the support rib 421 supports the bottom end of the inner ring of the bearing 35. Then, the second fixing ring 412 of the outer carrier 41 is disposed above upper surface 420 of the inner periphery of the inner carrier 42. The bolt 43 is tightened to press the top end of the inner ring of the bearing 35 downward through the lower surface 4120 of the second fixing ring 412, such that the bottom end of the inner ring of the bearing 35 ultimately abuts against the support rib 421. That is, the frictional resistance between the inner ring of the bearing 35 and the outer periphery of the inner carrier 42 can be overcome only by tightening the bolt 43, facilitating the assembly of the bearing 35.

The bolt 43 passes through the second fixing ring 412 from top to bottom and is then screwed into the outer periphery of the inner carrier 42. The lower surface 4120 of the second fixing ring 412 and the upper surface 420 of the outer periphery of the inner carrier 42 form a clearance fit. That is, gap 4201 is formed between the lower surface 4120 of the second fixing ring 412 and the upper surface 420 of the outer periphery of the inner carrier 42. During the assembly process, the bolt 43 is tightened to press the second fixing ring 412 downward. The lower surface 4120 of the second fixing ring 412 contacts a top surface of the inner ring of the bearing 35 and continuously pushes the inner ring of the bearing 35 downward until the bottom end of the inner ring of the bearing 35 is pressed against the support rib 421. Since the lower surface 4120 of the second fixing ring 412 and the upper surface 420 of the outer periphery of the inner carrier 42 are in a clearance fit, the second fixing ring 412 can fully press the inner ring of the bearing 35 downward. This can eliminate the fit clearance between the bottom end of the inner ring of the bearing 35 and the support rib 421, preventing axial loosening of the inner ring of the bearing 35 relative to the connection carrier 40.

The first fixing ring 411 is disposed above the projecting support rib 311 and is provided with multiple connection arms 414 extending downward. The multiple connection arms 414 are disposed on an inner surface of the rotor 22 and are fixedly connected to the rotor 22. The connection ribs 413 located between the first fixing ring 411 and the second fixing ring 412 are arranged obliquely. Specifically, in the radial direction of the actuator, the connection ribs 413 are gradually inclined downward from an outer side to an inner side, such that a height of the second fixing ring 412 is lower than a height of the first fixing ring 411. The second fixing ring 412 is disposed between a top end surface of the projecting support rib 311 and the upper surface 420 of the outer periphery of the inner carrier 42. Thus, in the height direction, the height of the lower surface 4120 of the second fixing ring 412 is reduced. The connection carrier 40 can span the inner ring gear 31, and the mounting position of the bearing 35 is not too high. The position of the bearing 35 can be as close as possible to the center of gravity of the rotating structure formed by the connection carrier 40 and the rotor 22, improving the stability of the rotation of the rotor 22. The connection carrier 40 of the inner carrier 42 is set as a sunken structure to make space for other components inside the actuator. This design makes the internal structure of the actuator more compact, thereby reducing the axial dimension of the actuator.

It should be pointed out that the connection ribs 413 can be entirely set as an inclined structure, or only a portion of the connection ribs 413 can be set as an inclined structure. For example, a portion of the connection ribs 413 close to the first fixing ring 411 is set to be consistent with the radial direction of the actuator, and a portion of the connection ribs 413 close to the second fixing ring 412 is set to incline downward. In this way, the second fixing ring 412 is located at the inner side of the projecting support rib 311, lowering the mounting height of the inner carrier 42 and allowing the outer carrier 41 to span above the top of the projecting support rib 311 so as to avoid the projecting support rib 311.

The inner side surface of the projecting support rib 311 is provided with support step 312 and snap groove 314 located above the support step 312. A distance between the snap groove 314 and the support step 312 is comparable to an axial dimension of the outer ring of the bearing 35. The snap ring 313 is snapped into the snap groove 314. The top end of the outer ring of the bearing 35 abuts against the snap ring 313, and the bottom end of the outer ring of the bearing 35 abuts against the support step 312. The snap groove 314 of the projecting support rib 311 holds the snap ring 313 in place on the projecting support rib 311, preventing axial movement of the snap ring 313. Thus, the snap ring 313 cooperates with the support step 312 to fix the outer ring of the bearing 35 to the projecting support rib 311, preventing axial movement of the outer ring of the bearing 35 relative to the projecting support rib 311.

The housing further includes upper cover 13. The upper cover 13 is detachably fixed to an upper end portion of the side wall 11. Specifically, the upper cover 13 can be fixed to the upper end portion of the side wall 11 by a screw around a periphery of the upper cover. Through the detachable upper cover 13, the motor 20, the planetary reducer, and the connection carrier 40 can be disposed into the internal space of the housing through an opening at the upper end portion of the side wall 11. Then the upper cover 13 is fixed to the upper end portion of the side wall 11, thereby utilizing the upper cover 13 to enclose the internal space of the housing. This further facilitates the overall assembly of the actuator.

To facilitate the synchronous connection of the connection carrier 40 and the sun gear 32, the inner carrier 42 is provided with shaft sleeve 422 extending downward. A shaft of the sun gear 32 extends upward and is inserted into the shaft sleeve 422 from bottom to top. An upper end surface of the sun gear 32 abuts against a lower end surface of the shaft sleeve 422. Keyways are provided on an inner wall surface of the shaft sleeve 422 and an outer surface of the shaft of the sun gear 32, respectively. A key is provided in the keyways to achieve a key connection between the shaft sleeve 422 and the shaft of the sun gear 32. Through the shaft sleeve 422, the inner periphery of the inner carrier 42 is connected to the shaft sleeve 422 of the sun gear 32, increasing the axial dimension for the cooperation between the inner carrier 42 and the sun gear 32. Thus, the synchronous connection between the connection carrier 40 and the sun gear 32 is more stable, making the power transmission between the connection carrier 40 and the planetary reducer smoother.

Bottom surface 423 of the inner carrier 42 is offset upward from upper end surface 315 of an inner tooth of the inner ring gear 31 by a distance of 0-8 mm. That is, the bottom surface 423 of the inner carrier 42 is flush with or slightly higher than the upper end surface 315 of the inner tooth of the inner ring gear 31. Preferably, the bottom surface 423 of the inner carrier 42 is flush with the upper end surface 315 of the inner tooth of the inner ring gear 31 to make full use of the axial space of the actuator. The bottom surface 423 of the inner carrier 42 is provided with avoidance groove 424 recessed upward. A portion of a top of the planetary carrier 33 is embedded in the avoidance groove 424. By providing the avoidance groove 424 in the inner carrier 42, the planetary carrier 33 is avoided in the axial direction of the actuator, thereby preventing interference between the planetary carrier 33 and the connection carrier 40. In addition, this design reduces the space occupied by the planetary reducer and the connection carrier 40 in the axial direction of the actuator, thereby reducing the axial dimension of the actuator.

The present disclosure provides a robot joint, including the aforementioned actuator with a planetary reducer. Other structures of the robot joint are the same as those in the prior art and are not described in detail here.

The invention claimed is:

1. An actuator with a planetary reducer, comprising: a housing, a motor, and the planetary reducer, wherein
    the planetary reducer comprises an inner ring gear fixed in a matched manner to the housing, and further comprises a sun gear, a planetary carrier, and a planetary gear; the sun gear, the planetary carrier, and the planetary gear are all located at an inner side of the inner ring gear; the planetary gear is pivotally connected to the planetary carrier and is meshed between the sun gear and the inner ring gear; a mounting chamber is formed between the inner ring gear and the housing; the inner ring gear is provided with a projecting support rib arranged annularly; and an inner side surface of the projecting support rib is provided with a pressing member detachably fixed to the projecting support rib;

the motor is disposed inside the mounting chamber, and comprises a stator fixed in a matched manner to the housing and a rotor matched with the stator; and the rotor is synchronously connected to the sun gear through a connection carrier; and
    the connection carrier comprises an outer carrier and an inner carrier; an outer periphery of the outer carrier is fixedly connected to the rotor, and an inner periphery of the outer carrier spans above an end portion of the projecting support rib and extends to an inner side of the projecting support rib; an outer periphery of the inner carrier is fixedly connected to the inner periphery of the outer carrier through a bolt; the inner carrier is configured to be embedded into the projecting support rib through an opening at the end portion of the projecting support rib; a bearing is provided between the projecting support rib and the inner carrier to pivotally connect the connection carrier to the projecting support rib; and an outer ring of the bearing is clamped between the pressing member and the projecting support rib, and an inner ring of the bearing is clamped between the outer carrier and the inner carrier.

2. The actuator with the planetary reducer according to claim 1, wherein the housing comprises a side wall and a support wall extending inward from an inner surface of the side wall along a radial direction of the actuator; a lower end portion of the inner ring gear is connected to the support wall; and the mounting chamber is enclosed by the inner ring gear, the side wall, and the support wall.

3. The actuator with the planetary reducer according to claim 2, wherein the outer carrier comprises a first fixing ring located at the outer periphery of the outer carrier, a second fixing ring located at the inner periphery of the outer carrier, and a connection rib connected between the first fixing ring and the second fixing ring; the second fixing ring is disposed above an upper surface of the outer periphery of the inner carrier; a bottom of the outer periphery of the inner carrier is provided with a support rib extending outward; and a top end of the inner ring of the bearing abuts against a lower surface of the second fixing ring, and a bottom end of the inner ring of the bearing abuts against the support rib.

4. The actuator with the planetary reducer according to claim 3, wherein the bolt passes through the second fixing ring from top to bottom and is screwed into the outer periphery of the inner carrier; and the lower surface of the second fixing ring and the upper surface of the outer periphery of the inner carrier form a clearance fit.

5. The actuator with the planetary reducer according to claim 3, wherein the first fixing ring is disposed above the projecting support rib and is provided with a connection arm extending downward and fixedly connected to the rotor; in the radial direction of the actuator, at least one segment of the connection rib is gradually inclined downward from an outer side to an inner side, and the second fixing ring is disposed between a top end surface of the projecting support rib and the upper surface of the outer periphery of the inner carrier.

6. The actuator with the planetary reducer according to claim 2, wherein the inner side surface of the projecting support rib is provided with a support step and a snap groove located above the support step; the pressing member is a snap ring snapped into the snap groove; and a top end of the outer ring of the bearing abuts against the snap ring, and a bottom end of the outer ring of the bearing abuts against the support step.

7. The actuator with the planetary reducer according to claim 2, wherein the housing further comprises an upper cover; and the upper cover is detachably fixed to an upper end portion of the side wall.

8. The actuator with the planetary reducer according to claim 1, wherein the inner carrier is provided with a shaft sleeve extending downward; a shaft of the sun gear is inserted into the shaft sleeve; an upper end surface of the sun gear abuts against a lower end surface of the shaft sleeve; and the shaft sleeve is connected to the shaft of the sun gear through a key.

9. The actuator with the planetary reducer according to claim 1, wherein a bottom surface of the inner carrier is offset upward from an upper end surface of an inner tooth of the inner ring gear by a distance of 0-8 mm; the bottom surface of the inner carrier is provided with an avoidance groove recessed upward; and at least a portion of the planetary carrier is embedded in the avoidance groove.

10. A robot joint, comprising the actuator according to claim 1.

11. The robot joint according to claim 10, wherein, in the actuator, the housing comprises a side wall and a support wall extending inward from an inner surface of the side wall along a radial direction of the actuator; a lower end portion of the inner ring gear is connected to the support wall; and the mounting chamber is enclosed by the inner ring gear, the side wall, and the support wall.

12. The robot joint according to claim 11, wherein, in the actuator, the outer carrier comprises a first fixing ring located at the outer periphery of the outer carrier, a second fixing ring located at the inner periphery of the outer carrier, and a connection rib connected between the first fixing ring and the second fixing ring; the second fixing ring is disposed above an upper surface of the outer periphery of the inner carrier; a bottom of the outer periphery of the inner carrier is provided with a support rib extending outward; and a top end of the inner ring of the bearing abuts against a lower surface of the second fixing ring, and a bottom end of the inner ring of the bearing abuts against the support rib.

13. The robot joint according to claim 12, wherein, in the actuator, the bolt passes through the second fixing ring from top to bottom and is screwed into the outer periphery of the inner carrier; and the lower surface of the second fixing ring and the upper surface of the outer periphery of the inner carrier form a clearance fit.

14. The robot joint according to claim 12, wherein, in the actuator, the first fixing ring is disposed above the projecting support rib and is provided with a connection arm extending downward and fixedly connected to the rotor; in the radial direction of the actuator, at least one segment of the connection rib is gradually inclined downward from an outer side to an inner side, and the second fixing ring is disposed between a top end surface of the projecting support rib and the upper surface of the outer periphery of the inner carrier.

15. The robot joint according to claim 11, wherein, in the actuator, the inner side surface of the projecting support rib is provided with a support step and a snap groove located above the support step; the pressing member is a snap ring snapped into the snap groove; and a top end of the outer ring of the bearing abuts against the snap ring, and a bottom end of the outer ring of the bearing abuts against the support step.

16. The robot joint according to claim 11, wherein, in the actuator, the housing further comprises an upper cover; and the upper cover is detachably fixed to an upper end portion of the side wall.

17. The robot joint according to claim 10, wherein, in the actuator, the inner carrier is provided with a shaft sleeve extending downward; a shaft of the sun gear is inserted into the shaft sleeve; an upper end surface of the sun gear abuts against a lower end surface of the shaft sleeve; and the shaft sleeve is connected to the shaft of the sun gear through a key.

18. The robot joint according to claim 10, wherein, in the actuator, a bottom surface of the inner carrier is offset upward from an upper end surface of an inner tooth of the inner ring gear by a distance of 0-8 mm; the bottom surface of the inner carrier is provided with an avoidance groove recessed upward; and at least a portion of the planetary carrier is embedded in the avoidance groove.

\* \* \* \* \*